United States Patent [19]
McClintock et al.

[11] Patent Number: 6,093,910
[45] Date of Patent: Jul. 25, 2000

[54] ELECTRIC SEAT HEATER

[75] Inventors: Brian McClintock, Novi; David W. Gaines, Farmington, both of Mich.

[73] Assignee: Tachi-S Engineering, USA Inc., Farmington Hills, Mich.

[21] Appl. No.: 09/183,875

[22] Filed: Oct. 30, 1998

[51] Int. Cl.[7] ..................................................... H05B 1/00
[52] U.S. Cl. .................... 219/217; 219/452; 219/549; 219/543; 219/202; 165/41; 297/180; 428/208
[58] Field of Search ................. 165/41, 42; 219/217, 219/202, 494, 528, 549, 543, 553; 338/308, 314; 297/452.55, 468, 218.1, 180; 428/209, 901

[56] References Cited

U.S. PATENT DOCUMENTS

| | | | |
|---|---|---|---|
| 3,136,577 | 6/1964 | Richard | 297/180 |
| 4,640,340 | 2/1987 | Noda et al. | 165/41 |
| 4,697,064 | 9/1987 | Altmann et al. | 219/217 |
| 4,711,496 | 12/1987 | Lathers et al. | 297/452 |
| 4,827,103 | 5/1989 | Asp | 219/217 |
| 4,912,306 | 3/1990 | Grise et al. | 219/549 |
| 5,229,582 | 7/1993 | Graham . | |
| 5,414,245 | 5/1995 | Hackleman . | |
| 5,432,322 | 7/1995 | Ingram et al. . | |
| 5,565,124 | 10/1996 | Balzano . | |
| 5,582,754 | 12/1996 | Smith et al. . | |
| 5,652,019 | 7/1997 | Moran . | |
| 5,763,053 | 6/1998 | Isen et al. | 428/208 |
| 5,763,058 | 6/1998 | Isen et al. | 428/208 |

FOREIGN PATENT DOCUMENTS 2640482  6/1990  France .

*Primary Examiner*—Teresa Walberg
*Assistant Examiner*—L. Fastovsky
*Attorney, Agent, or Firm*—Dykema Gossett PLLC

[57] ABSTRACT

A heated vehicle seat is brought forth which includes a first bus bar of conductive ink applied to either the vehicle seat cushion or to its cover. The conductive ink can be applied directly to the seat cushion or cover, or the conductive ink can be applied to a noncellulosic fabric substrate which is then connected with the seat cushion or cover. A second bus bar of conductive ink is also applied. Between and connecting the two bus bars is a resistive pattern of a conductive ink. The heated vehicle seat has a high thermal reaction time and generates heat at a position closer to the vehicle seat occupant.

31 Claims, 4 Drawing Sheets

ELECTRIC SEAT HEATER

FIELD OF THE INVENTION

The field of the invention is that of personal heaters. More particularly, the present invention relates to heated automotive vehicle seats.

BACKGROUND OF THE INVENTION

The majority of vehicles when not in use are stored outside, exposed to the environment or in an unheated facility like a garage or carport. When stored in cold and inclement weather, the temperature of an automotive vehicle body approaches that of its surrounding environment. If a vehicle has been left in cold conditions for a length of time, the interior of the vehicle seat can become very cold. It can be very uncomfortable to sit in an automotive vehicle when the seats are cold. This is especially true if the vehicle seat occupant is wearing a coat which is waist length. A waist length coat does not provide any thermal protection for the buttocks and rear thigh region of a vehicle seat occupant. The coldness of the vehicle seat also in some instances can make it less compliant, thereby adding to the discomfort of a vehicle seat occupant. This is especially the case with vinyl covered seating. Furthermore, cold vehicle seats can also provide an environmental hazard. Unfortunately, many people are inspired to start their vehicles, turn on the heater, and allow the vehicle to idle until the vehicle interior and seats are comfortably warm before they drive the vehicle. The above-noted procedure leads to an increase of consumption of hydrocarbon fuel, as well as adding to the greenhouse gases which are generated in the atmosphere.

To avoid the discomforts and negative aspects of vehicle operation which are caused by cold vehicle seating, seat heaters have been provided. Seat heaters mainly have a configuration of a wire heater coil that is embedded within the vehicle seat. However, heater coils provide several disadvantages. One disadvantage is that the wire heater coil of the seat heater is a major cost contributor to the heating system. A second major disadvantage is that the heater coil must be padded to prevent the heater coil from causing discomfort to the vehicle seat occupant. The discomfort is caused by the stiffness or rigidity of the heater coil. Padding causes the wire heater coil to be placed further away from the seat occupant The padding of the heater coil negatively affects heat transfer by increasing the thermal insulation between the wire heater coil and the seat occupant. Therefore, a wire heater coil having a greater heat generating capability or capacity than is actually needed typically must be specified to compensate for the insulation. Still another problem that the insulation contributes to is the decrease of the thermal to transfer rate. The thermal transfer rate is reflected in the time it takes the seat to heat up. Therefore, to have an appropriate thermal transfer rate, the wire heater coil heat generating capacity must be specified above what typically would be required if the wire heater coil was allowed to be in a location more adjacent to the vehicle seat occupant's body. Still another problem of wire heater coils is that it inhibits recycling of the surrounding foam rubber vehicle seat materials.

SUMMARY OF THE INVENTION

To overcome the above-noted disadvantages associated with prior automotive vehicle seat heaters the revelation of the present invention is brought forth. The present invention provides the freedom of providing an automotive vehicle seat heater which is flexible and can be positioned more adjacent to a vehicle seat occupant. In a preferred embodiment, the vehicle seat heater of the present invention includes a first bus bar of conductive ink applied to either the vehicle seat cushion or to its cover. The conductive ink can be applied directly to the seat cushion or cover, or the conductive ink can be applied to a noncellulosic fabric substrate which is then connected with the seat cushion or cover. A second bus bar of conductive ink is also applied. Between and connecting the two bus bars is a resistive pattern also provided by a conductive ink. The present invention meets an objective of providing a heater with a high thermal reaction time which can positioned closer to the vehicle seat occupant The present invention also meets an objective of providing a heated seat with lowering the cost of vehicle seat heaters therefore making the comfort, safety and environmental benefits of the technology more available to a broader economic spectrum of automotive vehicle owners.

The above-noted objectives and other advantages of the present invention will become more apparent to those skilled in the art as the invention is further explained in the accompanying detailed description and drawings.

DETAILED DESCRIPTION OF THE DRAWINGS

Figure 1:
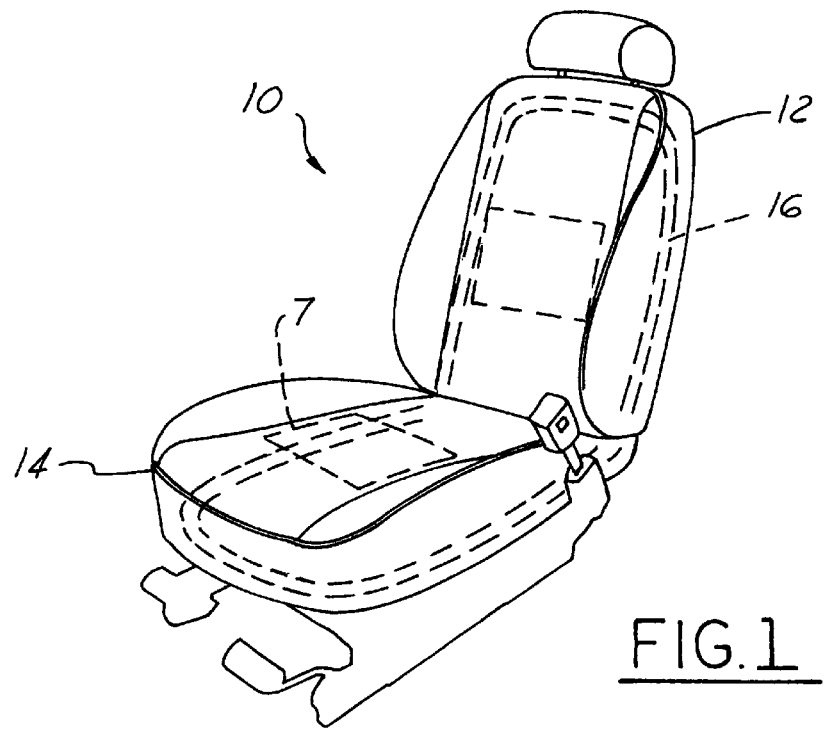
FIG. 1 is a perspective view of a preferred embodiment automotive vehicle seat with a heater according to the present invention.

Referring to FIG. 1 a heated occupant support structure in the form of an automotive vehicle seat 10 is provided. The vehicle seat 10 has heaters 7 according to the present invention.

The vehicle seat 10 has a seat back 12 joined to a seat bun 14. The seat 10 has a support structure provided by a steel frame member 16 which supports the seat back 12 and seat bun 14 have. The seat back 12 and the seat bun 14 separately or jointly controlled heaters 7. The heaters 7 for the seat back and seat bun are sized differently, but their structure and functional operation are identical, therefore only the heater in the seat bun is described herein.

Figure 2:
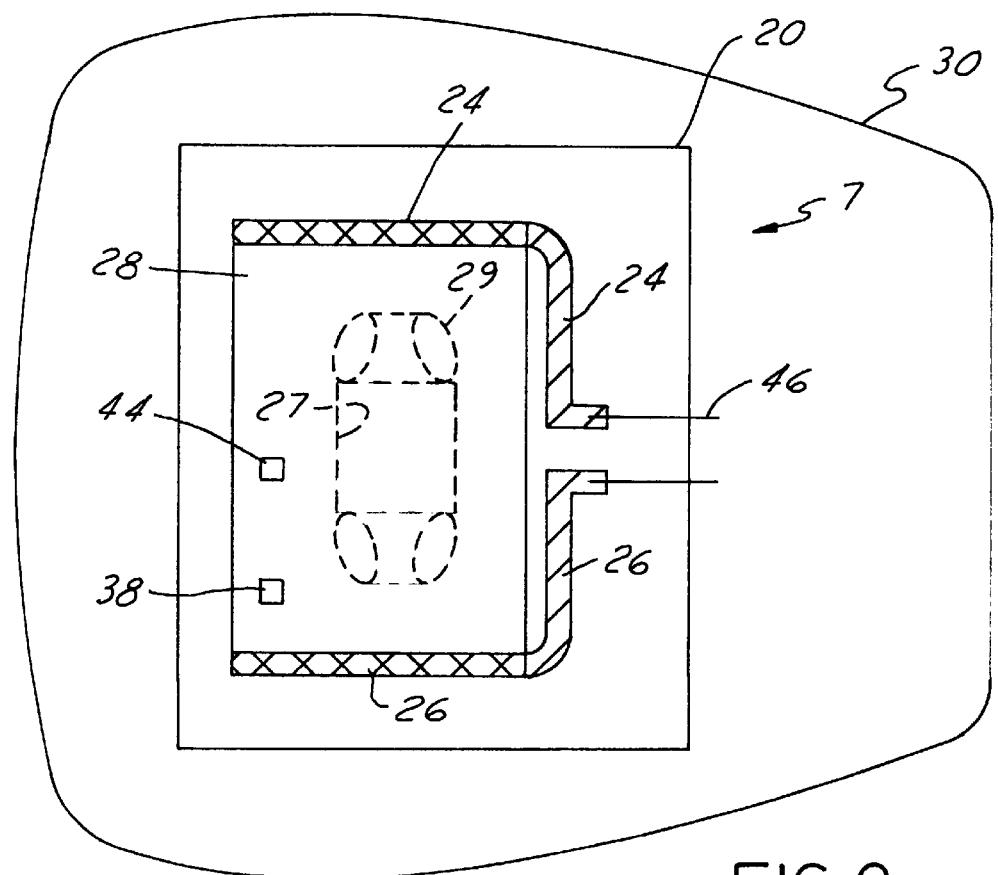
FIG. 2 is an enlarged top view of the attached heater portion and bun seat cushion of the heated vehicle seat shown in FIG. 1.
Figure 3:
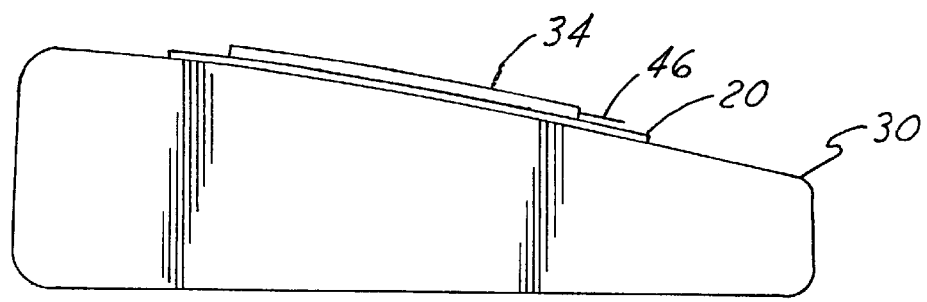
FIG. 3 is a side elevational view of a seat bun cushion with the attached heater as shown in FIG. 2.

Referring additionally to FIGS. 2 and 3, the seat heater 7 of the present invention has a substrate 20. The substrate 20 is fabricated from a flexible noncellulosic fabric having zero or very little porosity. A preferred substrate 20 is a spun-bonded olefin such as Dupont® Tyvek® olefin or polyester with a thickness between 0.2 mm and 2.0 mm. The fabric substrate 20 should have good tensile strength and have good flexibility. The fabric substrate 20 should not crinkle like mylar or other polymer films. Also the fabric substrate should be able to withstand 120° C. As shown, the fabric substrate 20 is Tyvek type 143® manufactured and sold by Dupont of Wilmington, Del. Tyvek® is formed of a sheet of varying thickness to simulate some of the characteristics of woven fabric. A preferred color of the fabric substrate 20 is white.

The vehicle seat 10 has a first body or cushion 30 which provides the bun support The cushion 30 is mounted to the frame member 16 by any conventional means. The fabric substrate 20 is connected with the cushion 30 by sewing or other conventional joining techniques such as the use of an adhesive film or web.

Applied by printing on the fabric substrate 20 is a first bus bar 24. The first bus bar 24 as shown 2 cm wide and can be 30–60 cm in total length. The first bus bar 24 is formed from a conductive ink with 0.05 ohm electrical qualities. The conductive elements in the first bus bar 24 will typically give it a tan color. The viscosity of the ink of the first bus bar 24 will typically be 7–20 ueps. In a preferred embodiment, the first bus bar 24 is printed on the substrate by a silk screen printing process. An alternative process is to use an ink jet type printer to put the ink on the substrate 20.

A second bus bar 26 is provided parallel spaced from the first bus bar 24. The major length of the second bus bar 26 is spaced away from the first bus bar 24. The second bus bar 26 is essentially identical to the first bus bar 24 to form the width of the desired spaced heater surface. Connecting the bus bars 24, 26 is a resistive pattern or path 28. The resistive pattern 28 is provided by conductive ink. The resistive pattern conductive ink has an electrical resistance greater than 0.05 ohm providing greater resistance than the ink of the first and second bus bars 24, 26. The resistive pattern 28 is deposited at 0.75–1.2 mils. The resistive pattern 28 is printed by a silk screening process or ink jet printing. The lamp black in the conductive ink of the resistive pattern will typically give it a black appearance. Typically, the bus bars 24, 26 are first applied and the resistive pattern 28 with extreme ends overlapping the bus bars 24, 26 is then applied. The ink for the bus bars 24, 26 is manufactured and sold by Englehard, Inc., East Newark, N.J.

If it is desirable for the heater 7 to have an open space 27, balance bars 29 of a conductive ink with less electrical resistance then the remainder of the resistive path 28 are added to provide current flow in the areas laterally adjacent to the open space 27 and thereby maintain a more even temperature distribution throughout the resistive path 28.

The heater 7 is covered with a protective layer of film 34. The film 34 is polyurethane or other suitable alternatives such as polyester. The film is 0.2–4.5 mils thick. A typical film 34 utilized is sold under the trade name Heat Seal Adhesives and is manufactured by Bemis Associates, Inc. company of Shirley, Massachusetts. The protective film 34 hermetically seals the heater 7 and protects the bus bars 24, 26 and the resistive path 28. The protective film is placed over the ink on the substrate 20. The substrate and film are heated, causing the film to soften and bond to the substrate, and hermetically sealing the ink between the film and the substrate.

The protective film 34 also covers and connects a temperature regulator 38 and temperature sensor 44 disposed on the fabric substrate 20. Additionally, the electrical power lines 46 are connected to the substrate 20 by the protective film 34.

A typical temperature sensor 38 is sold under the trade name of NTC Thermistor by RIF Electronics of Anaheim, Calif. The temperature sensor 38 has 10–25K ohm @ 25° C. A typical temperature regulator 44 is sold by Bosch of Farmington Hills, Mich. The temperature regulator 44 has Automotive OEM 12 volt technical specifications.

In operation, when connected to 12 volt automotive electrical system the heater 7 has a resistivity of 3–30 ohms and generates 10–60 watts from –40° C. to 55° C. in 0.25–5.0 min.

Figure 4:
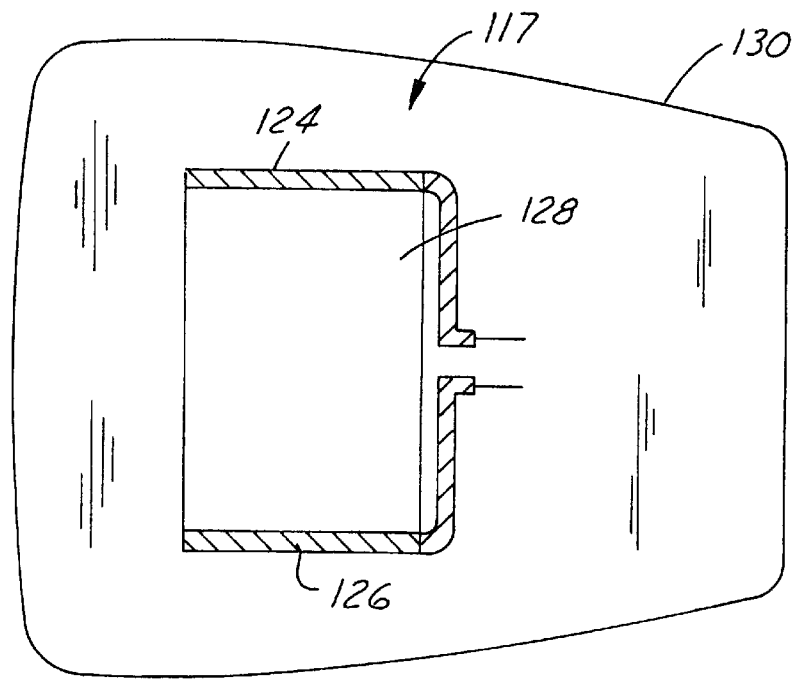
FIG. 4 is a view similar to that of FIG. 2 wherein bus bars and a resistive path are incorporated into a polymeric seat bun cushion.
Figure 5:
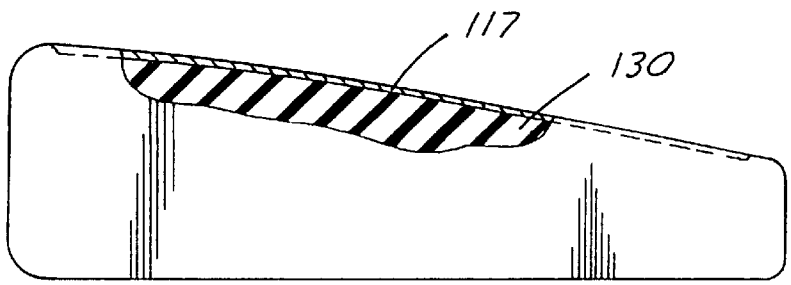
FIG. 5 is a side elevational view of a seat bun cushion with the incorporated heater as shown in FIG. 4.

Referring to FIGS. 4 and 5 an alternate preferred embodiment heater 117 is provided. In the heater 117, the first and second bus bars 124, 126 and resistive path 128 is directly applied to a polymeric foam bun cushion 130. A typical foam has a density of 0.02–0.060 gm/cm$^3$. The foam has an open cell configuration. The viscosity of the ink applied for the bus bars is 7–20 ueps gm/cm$^3$. Besides the advantage of elimination of the fabric substrate and the associated cost of attaching the substrate to the foam bun the heater 117 provides many advantages. The heater 117 can be sewn or inserted into a trim cover providing cushioning and acting as a heater. By customizing the formulation (of foam ink and ink patterns), it is possible to have the heater 17 function only on the seating surface compressed by contact with the occupant.

Figure 6:
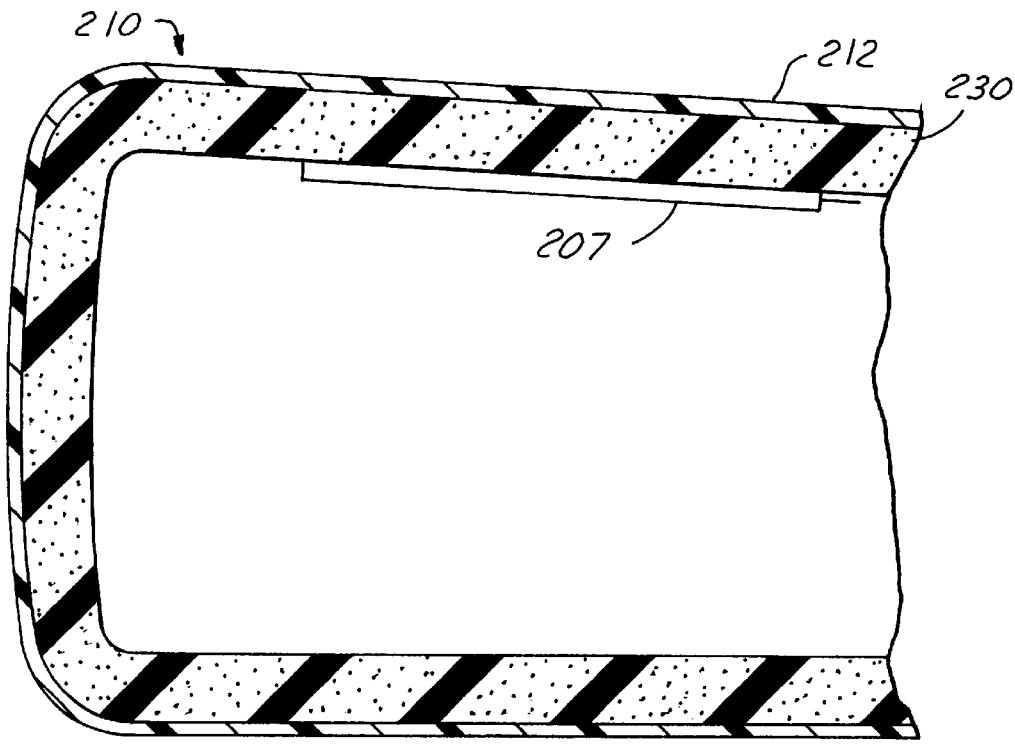
FIG. 6 is an enlarged side sectional view of an alternate preferred embodiment heater of the present invention incorporated in a vehicle seat cover.

Referring to FIG. 6, still another embodiment of the present invention is shown. In the embodiment of FIG. 6, a heater 207 substantially similar to heater 7 has bus bars and a resistive pattern applied to a substrate. A two-part membrane forms the seat cover 210. A first part 212 provides a boundary layer of skin, such as leather, fabric or vinyl for an interface with an entity or vehicle seat occupant. A second part 230 provides a thin layer of foam insulation. The substrate of heater 207 is connected with or attached to the foam insulation layer 230 on a side of the insulation opposite the boundary layer 212. An advantage of the seat cover 210 is that if the heated seat is sold as an option, the same basic seat cover configuration can be used for heated and unheated seats. This facilitates seat assembly in that the same operation is used to assemble both heated and unheated seats, with the only difference being the selection of the proper seat cover either having or not having the heater 207 attached therein.

Figure 7:
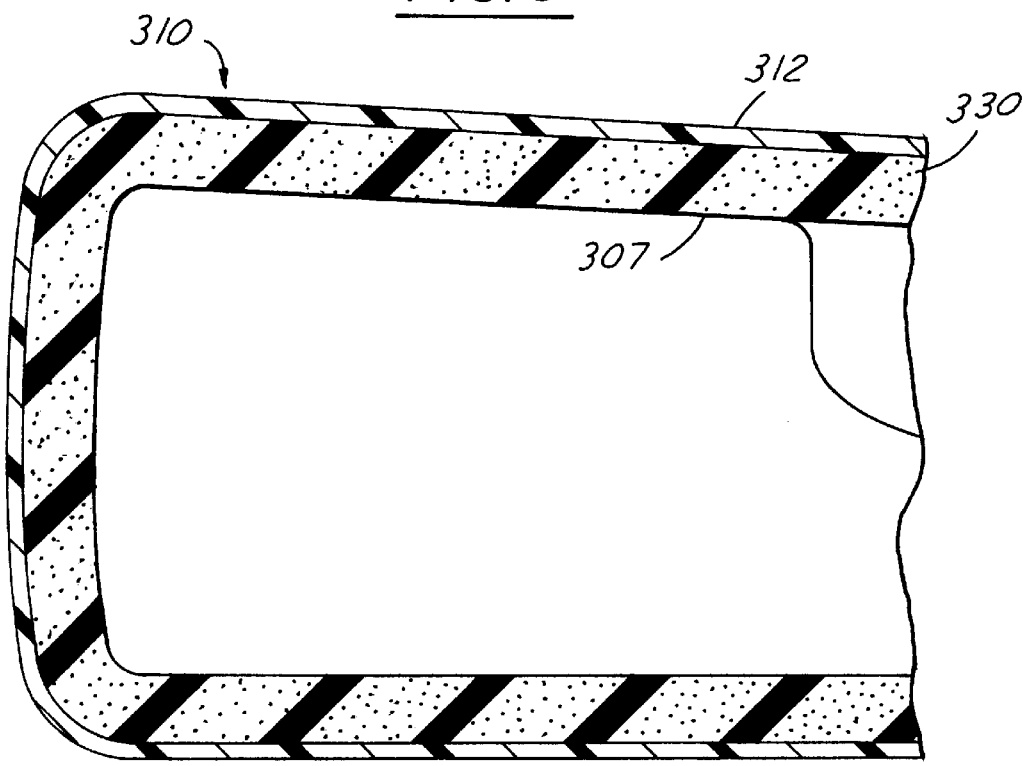
FIG. 7 is an enlarged side sectional view of another alternate preferred embodiment heater of the present invention incorporated in a vehicle seat cover.

FIG. 7 provides a seat cover 310. The seat cover 310 provides a two part membrane for covering the seat bun cushion as previously described. In the embodiment of the heater 307, the bus bars and the resistive path are directly applied to the thin layer of foam insulation 330. The bus bars and resistive path are shown on a side of the foam opposite the boundary layer 312, but could potentially be placed on the side of foam layer 330 facing boundary layer 312.

Figure 8:
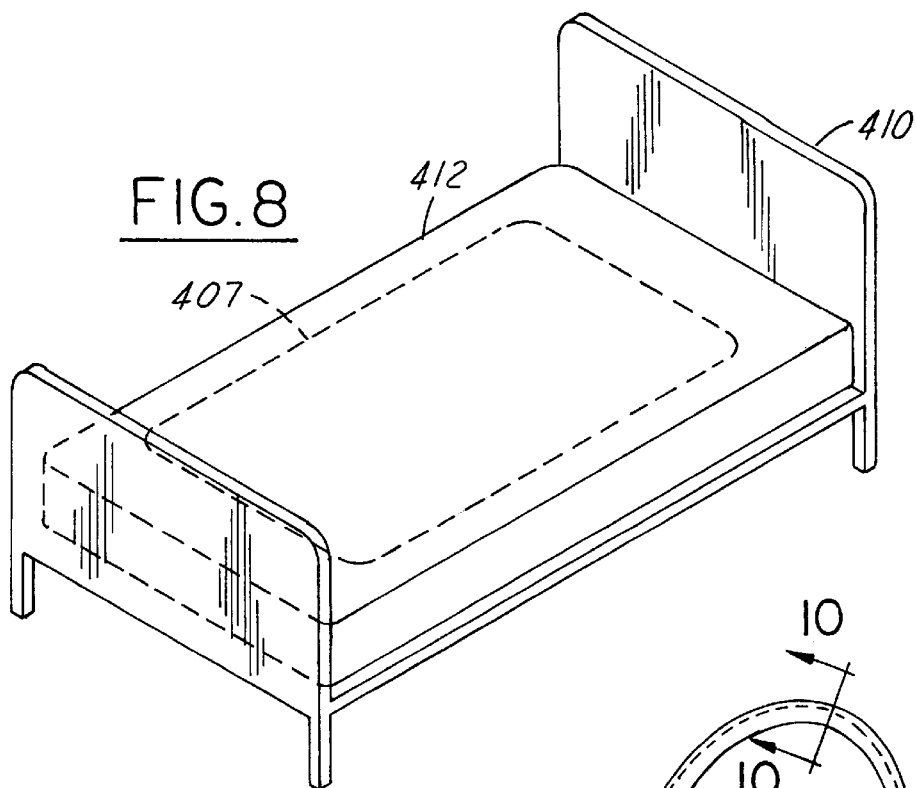
FIG. 8 is a perspective view of a hospital bed with a heater according to the present invention.

It should be appreciated that this invention is not limited in its applicability to car seats. FIGS. 8 illustrates a heated occupant support structure 410 provided by a hospital bed 410. The hospital bed 410 has a membrane cover 412 which on an underside has connected thereto a heater 407. The bus bars and the resistive path are either directly applied to a foam padding of the underside of the membrane 412 or to a substrate connected underneath the foam padding of the membrane 412 in a manner as previously described.

Figure 9:
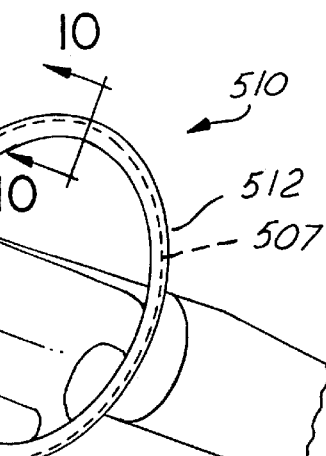
FIG. 9 is a perspective view of a preferred embodiment automotive steering wheel assembly with a heater according to the present invention.
Figure 10:
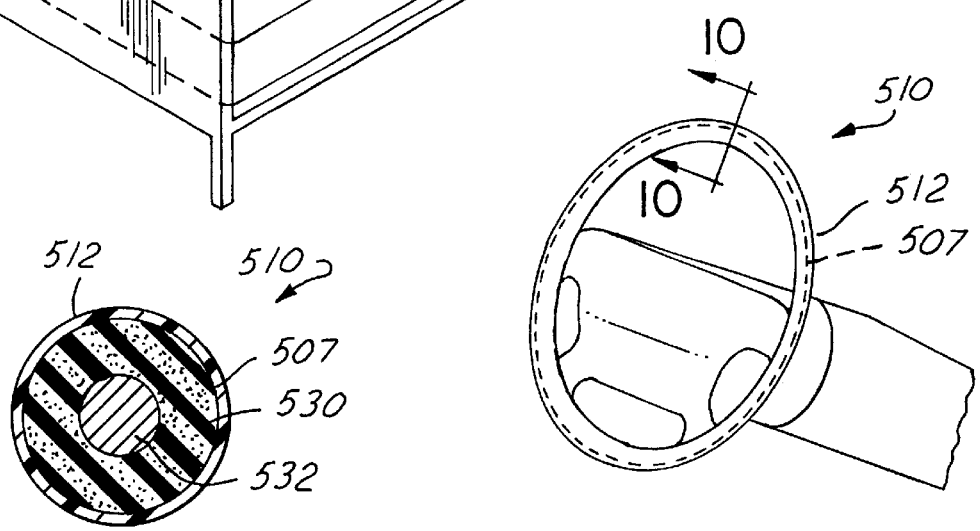
FIG. 10 is a sectional view taken from FIG. 9.

FIGS. 9 and 10 show still another embodiment of the present invention. FIGS. 9 and 10 show a heated steering wheel. The heated steering wheel 510 has a membrane cover 512 having a fabric coated substrate or direct coated heater 507 interposed between itself and the insulation 530 which surrounds the core 532 of the steering wheel. The heated steering wheel 510 not only greatly enhances driver comfort but also provides a much noted safety feature by allowing the vehicle operator to have a better grip over a cold steering wheel.

The embodiment of the present invention shown in FIGS. 2, 4, and 6 or other slight variations can also serve as a seat antenna. The antenna acts as a seat occupant sensor in connection with the passenger bag system and security systems or to receive RF signals for seat or vehicle security and/or safety system actuation.

In still another embodiment of the present invention, in a cushion or seat cover arrangement as shown in FIGS. 1–7, a thermal conducting foam is utilized. An example of a thermal conducting foam is Comfortem® by Foam International, Inc. The Comfortem® foam has a Thermasorb® additive which is a micro-encapsulated phase change material (Micro-PCM's) that can depending on application, absorb or release large amounts of heat without a corresponding change in temperature. The additive is manufactured and sold by Frisby Technologies Inc., Winston-Salem, N.J.

Figure 11:
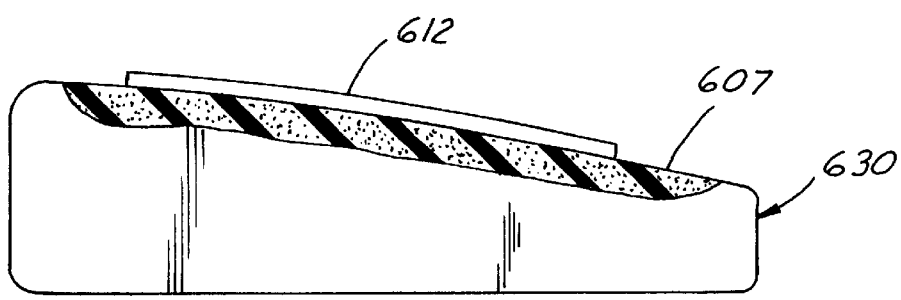
FIG. 11 is a view of an alternate embodiment heater of the present invention with COMFORTEM foam.

In the example of FIG. 11, a heater 607 is formed on a substrate similar to that of FIG. 2 or a foam bun 630 in a manner similar to that shown in FIGS. 4 and 5. A layer of Comfortem® foam 612 which is configures to reach a temperature of 50° C. is placed on top or incorporated in the foam insulation of the seat cover. The comfortemp foam will have a very low thermal resistance therefore the seat occupant will feel the heat in a shorter time period. In other embodiments not shown, the Comfortem foam may be incorporated in the seat cover or can be used in conjunction with a hospital bed, or heated steering wheel.

While the present invention was illustrated and described with respect to a preferred embodiment, such description is exemplary only and not limiting in nature. Other aspects, objects, and advantages of this invention may be obtained from the study of the drawings, and the disclosure. It is well understood by those skilled in the art that various changes and modifications can be made in the invention without departing from the spirit and scope thereof, which is limited only by the appended claims. For instance, the heater may be directly applied to a single layered membrane so long as the membrane has a low or zero porosity or between the layers in a two layered membrane.

We claim:

1. A heater comprising:
   a flexible non-woven noncellulosic fabric having zero or low porosity defining a substrate;
   a first bus bar of conductive ink applied to the fabric substrate;
   a second bus bar of conductive ink applied to the fabric substrate; and
   a resistive pattern connecting the first and second bus bars, the resistive pattern being provided by a conductive ink applied to the fabric substrate.

2. A heater as described in claim 1, wherein the non-woven fabric substrate is a spunbonded olefin.

3. An occupant support structure comprising:
   a frame member;
   a first body providing a cushion for an occupant, the first body being mounted with the frame member;
   a flexible non-woven noncellulosic fabric having zero or low porosity defining a substrate connected with the first body;
   a first bus bar of conductive ink applied to the fabric substrate;
   a second bus bar of conductive ink applied to the fabric substrate; and
   a resistive pattern connecting the first and second bus bars, the resistive pattern being provided by a conductive ink applied to the fabric substrate.

4. A heated occupant support structure as described in claim 3, wherein the frame member is a part of a seat.

5. A heated occupant support structure as described in claim 3, wherein the frame member is a part of a vehicle seat.

6. A heated occupant support structure as described in claim 3, wherein the first body provides support.

7. A heated occupant support structure as described in claim 3, wherein the first body provides insulation.

8. A heated occupant support structure as described in claim 5, wherein the first body provides support.

9. A heated occupant support structure as described in claim 5, wherein the first body provides insulation.

10. A heater comprising:
    a polymeric foam body;
    a first bus bar of conductive ink applied to the foam body;
    a second bus bar of conductive ink applied to the foam body; and
    a resistive pattern connecting the first and second bus bars, the resistive pattern being provided by a conductive ink applied to the foam body.

11. A heated cover for surrounding a cushion comprising:
    a boundary layer for covering the cushion providing an interface for contact between the cushion and an entity;
    an insulation layer connected with the boundary layer on a side of the boundary layer opposite the entity;
    a flexible non-woven noncellulosic fabric having zero or low porosity defining a substrate connected with the insulation layer;
    a first bus bar of conductive ink applied to the fabric substrate;
    a second bus bar of conductive ink applied to the fabric substrate; and
    a resistive pattern connecting the first and second bus bars, the resistive pattern being provided by a conductive ink applied to the fabric.

12. A heated cover as described in claim 11 for a seat cushion.

13. A heated cover as described in claim 12, for an automotive vehicle seat.

14. A heated seat cover for covering a cushion as described in claim 12, wherein the substrate is connected to the insulation layer on a side of the insulation layer opposite the boundary layer.

15. A heated seat cover for covering a cushion of a seat comprising:
    a boundary layer for providing an interface for a seat occupant in the seat cushion;
    a polymeric foam insulation layer adjacent said boundary layer;
    the polymeric foam insulation layer having applied thereon a first bus bar of connective ink;
    the polymeric foam insulation layer also having a second bus bar of connective ink applied thereon; and the polymeric foam insulation layer having applied thereon a resistive pattern connecting the first and second bus bars, the resistive pattern being provided by a conductive ink applied to the polymeric foam insulation layer.

16. A heated seat cover covering a cushion as described in claim 15, wherein the first and second bus bars and the resistive pattern are applied on a side of the insulation layer opposite the boundary layer.

17. A heated seat cover as described in claim 16, for covering a cushion of a automotive vehicle seat.

18. A heated seat cover for surrounding a cushion comprising:

a membrane for covering the cushion providing an interface for contact with an entity;

a flexible non-woven noncellulosic fabric having zero or low porosity defining a substrate connected with the membrane;

a first bus bar of conductive ink applied to the fabric substrate;

a second bus bar of conductive ink applied to the fabric substrate; and a resistive pattern connecting the bus bars, the resistive pattern being provided by a conductive ink applied to the fabric substrate.

19. A heated cover as described in claim 18, for an automotive vehicle seat.

20. A heater for a seat comprising:

a first polymeric foam member having a first surface;

a first bus bar of conductive ink applied to the polymeric foam on the first surface;

a second bus bar of conductive ink applied to the first surface of the polymeric foam member; and a resistive pattern connecting the first bus bar and the second bus bar provided by a conductive ink applied to the first surface of the polymeric foam.

21. A heater comprising:

a flexible non-woven noncellulosic fabric having zero or low porosity defining a substrate;

a first bus bar of conductive ink applied to the fabric substrate;

a second bus bar of conductive ink applied to the fabric substrate;

a resistive pattern connecting the first and second bus bars, the resistive pattern being provided by a conductive ink applied to the fabric substrate; and a protective layer covering the fabric substrate.

22. A heater as described in claim 21, wherein the protective layer is a polyurethane.

23. A heater as described in claim 21, wherein the heater hermetically seals the substrate.

24. A heater as described in claim 21, wherein the protective layer connects a temperature regulator with the fabric substrate.

25. A heater as described in claim 21, wherein the protective layer connects a temperature sensor with the fabric substrate.

26. A seat cushion cover comprising:

a membrane providing a covering for a seat cushion;

a noncellulosic non-woven flexible fabric having zero or low porosity defining a substrate connected with the membrane;

a first bus bar of conductive ink applied to the fabric membrane;

a second bus bar of conductive ink applied to the fabric membrane; and a resistive pattern connecting the first and second bus bars, the resistive pattern being provided by a conductive ink applied to the fabric substrate; and a protective layer covering the fabric substrate.

27. A heated steering wheel comprising:

a steering column;

a wheel connected to the column;

a cover connected to the wheel;

a first bus bar of conductive ink on a non-woven noncellulosic fabric having zero or low porosity defining a substrate connected with the cover;

a second bus bar of conductive ink on the fabric substrate; and a resistive pattern connecting the first and second bus bars, the resistive pattern being provided by a conductive ink on the fabric substrate.

28. A heater as described in claim 1 wherein the heater is covered with a polymeric foam having micro-encapsulated phase change materials.

29. A heater as described in claim 10 wherein the heater is covered with a polymeric foam having within the foam micro-encapsulated phase change materials.

30. A heater as described in claim 10 wherein the foam body has micro-encapsulated phase change materials with it.

31. An occupant support structure comprising:

a frame member;

a first body providing a cushion for an occupant, the first body being mounted with the frame member;

a flexible non-woven noncellulosic fabric having zero or low porosity defining a substrate connected with the first body, the substrate having an open space;

a first bus bar of conductive ink applied to the fabric substrate;

a second bus bar of conductive ink applied to the fabric substrate;

a resistive pattern connecting the first and second bus bars, the resistive pattern being provided by a conductive ink applied to the fabric substrate; and balance bars laterally adjacent the open space provided by a conductive ink with less resistance than the resistive pattern to maintain a more even temperature throughout the resistive pattern.

* * * * *